(12) United States Patent
Dicorpo et al.

(10) Patent No.: US 6,816,917 B2
(45) Date of Patent: Nov. 9, 2004

(54) STORAGE SYSTEM WITH LUN VIRTUALIZATION

(75) Inventors: Jeffrey Dicorpo, San Carlos, CA (US); Stanley Smith Feather, Jr., Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 11 days.

(21) Appl. No.: 10/346,045

(22) Filed: Jan. 15, 2003

(65) Prior Publication Data

US 2004/0139240 A1 Jul. 15, 2004

(51) Int. Cl.[7] .................................................. G06F 3/00
(52) U.S. Cl. ............................................. 710/5; 710/36
(58) Field of Search ........................... 710/5, 6, 20, 21, 710/36, 38, 39, 40, 41, 42, 58, 62, 72, 74

(56) References Cited

U.S. PATENT DOCUMENTS

| | | | | |
|---|---|---|---|---|
| 5,644,789 A | * | 7/1997 | Matthews et al. ............ | 710/36 |
| 5,941,972 A | * | 8/1999 | Hoese et al. ................. | 710/315 |
| 5,991,829 A | * | 11/1999 | Giorgio et al. ............... | 710/15 |
| 6,061,753 A | * | 5/2000 | Ericson ....................... | 710/107 |
| 6,122,723 A | * | 9/2000 | Day et al. ..................... | 712/29 |
| 6,209,023 B1 | * | 3/2001 | Dimitroff et al. ........... | 709/211 |
| 6,240,467 B1 | * | 5/2001 | Beardsley et al. ............ | 710/5 |
| 6,430,645 B1 | * | 8/2002 | Basham ...................... | 710/305 |
| 6,675,260 B2 | * | 1/2004 | Torrey et al. ............... | 711/114 |
| 2002/0059487 A1 | * | 5/2002 | Talati .......................... | 710/36 |

* cited by examiner

*Primary Examiner*—Fritz Fleming

(57) ABSTRACT

An apparatus comprises a data path capable of coupling a physical device to a plurality of initiators. An interface is coupled to the data path and forms a command pathway between the plurality of initiators and the physical device. The controller is coupled to the data path and coupled to the interface. A controller comprises an executable process that creates a virtual device object that resolves conflicting concurrent attempts to access the physical device by a plurality of initiators. The virtual device object is capable of protecting state of the physical device during successive data transfer and media movement operations by emulating responses of the physical device and redirecting access to the physical device when the physical device becomes available.

24 Claims, 11 Drawing Sheets

| Command | Behavior when LUN is bound | | Behavior when LUN is not bound | | |
|---|---|---|---|---|---|
| | | | LUN is busy | | LUN is not busy |
| | From an unbound initiator | From the bound initiator | From the primary initiator | From a secondary initiator | From any initiator |
| ACCESS CONTROL IN | Emulated | Allowed | Queued | Emulated | Allowed |
| ACCESS CONTROL OUT | Emulated | Allowed | Queued | Emulated | Allowed |
| CHANGE ALIASES | Conflict | Allowed | Queued | Conflict | Allowed |
| EXTENDED COPY | Conflict | Allowed | Queued | Conflict | Allowed |
| INQUIRY | Emulated | Allowed | Queued | Emulated | Allowed |
| LOG SELECT | Conflict | Allowed | Queued | Conflict | Allowed |
| LOG SENSE | Emulated | Allowed | Queued | Emulated | Allowed |
| MODE SELECT(6) MODE SELECT(10) | Conflict | Allowed | Queued | Conflict | Allowed |
| MODE SENSE(6) MODE SENSE(10) | Emulated | Allowed | Queued | Emulated | Allowed |
| PERSISTENT RESERVE IN | Emulated | Allowed | Queued | Emulated | Allowed |
| PERSISTENT RESERVE OUT | Emulated | Allowed | Queued | Emulated | Allowed |
| PREVENT/ALLOW PREVENT = 0 | Emulated | Allowed | Queued | Emulated | Allowed |
| PREVENT/ALLOW PREVENT <>0 | Conflict | Allowed | Queued | Conflict | Allowed |
| READ ATTRIBUTE | Conflict | Allowed | Queued | Conflict | Allowed |
| READ BUFFER | Conflict | Allowed | Queued | Conflict | Allowed |
| RECEIVE COPY RESULTS | Conflict | Allowed | Queued | Conflict | Allowed |
| RECEIVE DIAG RESULTS | Conflict | Allowed | Queued | Conflict | Allowed |
| RELEASE(6) RELEASE(10) | Emulated | Allowed | Queued | Emulated | Allowed |
| REPORT ALIASES | Emulated | Allowed | Queued | Emulated | Allowed |
| REPORT DEVICE IDENTIFIER | Emulated | Allowed | Queued | Emulated | Allowed |
| REPORT LUNS | Emulated | Allowed | Queued | Emulated | Allowed |
| REPORT SUPPORTED OPCODES | Emulated | Allowed | Queued | Emulated | Allowed |
| REPORT TARGET PORT GROUPS | Emulated | Allowed | Queued | Emulated | Allowed |
| REQUEST SENSE | Emulated | Allowed | Queued | Emulated | Allowed |
| RESERVE(6) RESERVE(10) | Emulated | Allowed | Queued | Emulated | Allowed |
| SEND DIAGNOSTICS | Conflict | Allowed | Queued | Conflict | Allowed |
| SET DEVICE IDENTIFIERS | Emulated | Allowed | Queued | Emulated | Allowed |
| SET TARGET PORT GROUPS | Emulated | Allowed | Queued | Emulated | Allowed |
| TEST UNIT READY | Emulated | Allowed | Queued | Emulated | Allowed |
| WRITE ATTRIBUTE | Conflict | Allowed | Queued | Conflict | Allowed |
| WRITE BUFFER | Conflict | Allowed | Queued | Conflict | Allowed |

FIG. 9A

| Command | Behavior when LUN is Bound | | Behavior when LUN is not bound | | |
|---|---|---|---|---|---|
| | | | LUN is busy | | LUN is not busy |
| | From an unbound initiator | From the bound initiator | From the primary initiator | From a secondary initiator | From any initiator |
| ERASE(6) ERASE(16) | Conflict | Allowed | n/a | n/a | n/a |
| FORMAT MEDIUM | Conflict | Allowed | n/a | n/a | n/a |
| LOAD UNLOAD | Conflict | Allowed | n/a | n/a | n/a |
| LOCATE(10) LOCATE(16) | Conflict | Allowed | n/a | n/a | n/a |
| READ(6) READ(16) | Conflict | Allowed | n/a | n/a | n/a |
| READ BLOCK LIMITS | Emulated | Allowed | Queued | Emulated | Allowed |
| READ POSITION | Conflict | Allowed | Queued | Conflict | Allowed |
| READ REVERSE(6) READ REVERSE(16) | Conflict | Allowed | n/a | n/a | n/a |
| RECOVER BUFFERED DATA | Conflict | Allowed | n/a | n/a | n/a |
| REPORT DENSITY SUPPORT | Emulated | Allowed | Queued | Emulated | Allowed |
| REWIND | Conflict | Allowed | n/a | n/a | n/a |
| SET CAPACITY | Conflict | Allowed | Queued | Conflict | Allowed |
| SPACE(6) SPACE(16) | Conflict | Allowed | n/a | n/a | n/a |
| VERIFY(6) VERIFY(16) | Conflict | Allowed | n/a | n/a | n/a |
| WRITE(6) WRITE(16) | Conflict | Allowed | n/a | n/a | n/a |
| WRITE FILEMARKS(6) WRITE FILEMARKS(16) | Conflict | Allowed | n/a | n/a | n/a |

FIG. 9B

| Value | Acquisition Method | Note |
|---|---|---|
| INQUIRY data | INQUIRY command, EVPD bit set to 0 | Normal INQUIRY data |
| INQUIRY: supported vital product pages | INQUIRY page 0x00 | |
| INQUIRY: unit serial number | INQUIRY page 0x80 | |
| INQUIRY: device identification page | INQUIRY page 0x83 | |
| INQUIRY: drive component revision levels | INQUIRY page 0xc0 – 0xc5 | |
| LOG SENSE: supported pages | LOG SENSE page 0x00 | |
| LOG SENSE: write error counters | LOG SENSE page 0x02 | |
| LOG SENSE: read error counters | LOG SENSE page 0x03 | |
| LOG SENSE: sequential access device log | LOG SENSE page 0x0c | |
| LOG SENSE: tape alert log | LOG SENSE page 0x2e | |
| LOG SENSE: tape usage log | LOG SENSE page 0x30 | |
| LOG SENSE: tape capacity log | LOG SENSE page 0x31 | |
| LOG SENSE: data compression log | LOG SENSE page 0x32 | |
| LOG SENSE: performance data log | LOG SENSE page 0x34 | |
| MODE SENSE: Disconnect/reconnect page | MODE SENSE page 0x02 | Also requires storage of the 6 and 10 byte MODE PARAMETER HEADER and BLOCK DESCRIPTOR |
| MODE SENSE: control mode | MODE SENSE page 0x0a | Also requires storage of the 6 and 10 byte MODE PARAMETER HEADER and BLOCK DESCRIPTOR |
| MODE SENSE: data compression characteristics | MODE SENSE page 0x0f | Also requires storage of the 6 and 10 byte MODE PARAMETER HEADER and BLOCK DESCRIPTOR |
| MODE SENSE: device c configuration | MODE SENSE page 0x10 | Also requires storage of the 6 and 10 byte MODE PARAMETER HEADER and BLOCK DESCRIPTOR |
| MODE SENSE: fibre channel logical unit control | MODE SENSE page 0x18 | Also requires storage of the 6 and 10 byte MODE PARAMETER HEADER and BLOCK DESCRIPTOR |
| MODE SENSE: fibre channel control | MODE SENSE page 0x19 | Also requires storage of the 6 and 10 byte MODE PARAMETER HEADER and BLOCK DESCRIPTOR |
| MODE SENSE: information exceptions | MODE SENSE page 0x1c | Also requires storage of the 6 and 10 byte MODE PARAMETER HEADER and BLOCK DESCRIPTOR |

FIG. 10A

| Value | Acquisition Method | Note |
|---|---|---|
| MODE SENSE: cd-rom emulation mode | MODE SENSE page 0x3e | Also requires storage of the 6 and 10 byte MODE PARAMETER HEADER and BLOCK DESCRIPTOR |
| MODE SENSE: all pages | MODE SENSE page 0x3f | Also requires storage of the 6 and 10 byte MODE PARAMETER HEADER and BLOCK DESCRIPTOR |
| PREVENT/ALLOW state | Initial value is set to the drive's default state.<br><br>When PREVENT/ALLOW is sampled, the state is updated based on status of the operation | |
| RESERVE/RELEASE state | Initial value is set to the drive's default state.<br><br>When PERSISTENT RESERVE/PERSISTENT RELEASE or RESERVE/RELEASE is sampled, the state is updated based on status of the operation | |
| Sense data | Initial value is set to the drive's default initial state (UNIT ATTN). This is maintained for each initiator's first access during the session.<br><br>Command status from the last 2 commands is stored on a per-initiator basis.<br><br>Sense data is stored from every REQUEST SENSE command on a per-initiator basis. | |
| Block limits | READ BLOCK LIMITS | |
| Density | REPORT DENSITY | |

FIG. 10B

STORAGE SYSTEM WITH LUN VIRTUALIZATION

RELATED APPLICATIONS

The disclosed system and operating method are related to subject matter disclosed in the following co-pending patent applications that are incorporated by reference herein in their entirety: (1) U.S. patent application Ser. No. 10/346,002, entitled "Dynamic Command Filter", and (2) U.S. patent application Ser. No. 10/346,158, entitled "Monitor for Obtaining Device State by Intelligent Sampling".

BACKGROUND OF THE INVENTION

Storage systems are commonly configured into Storage Area Networks (SANs) to facilitate connection of multiple server hosts on a network, enabling shared access to various connected storage resources.

A common protocol for transferring data between a host processor and one or more storage devices is the Small Computer Systems Interface (SCSI) protocol for example under UNIX™ and Windows NT™ operating systems. A host bus adapter (HBA) plugs into a bus slot on the server's internal bus and connects a SCSI cable to the storage device or subsystem, thereby creating a connection between server and storage devices. The host bus adapter enables a host or server to function as an initiator that begins transfer of data to and from a target device. Traditionally the SCSI protocol supports a combination of initiators and targets on a common bus, although configurations are conventionally limited to one initiator due to a lack of shared device management capability of available operating systems and physical limits of cabling.

Attempts to share target devices such as SCSI tape drives among multiple initiators expose several difficulties in conventional SAN configurations. Typically, configurations with multiple shared targets are designed primarily for inclusion of only a single initiator. Attempts to expand the number of initiators in a configuration by various techniques, such as addition of a bridge or router, fail to solve problems of availability, data integrity, and performance.

Routers handle multiple initiator operations by queuing commands. Queuing enables processing of each initiator's commands but creates timing problems imposed by the initiator's assumption of target ownership. An initiator that fails to receive a response from a target within timing specifications typically responds to the timing violation by initiating error recovery operations. In turn, the error recovery operations may affect data transfer of another initiator. Near simultaneous data transfer requests by multiple initiators can instigate multiple recovery loops and multiple failed backup/restore operations that result in loss of availability of the target resource to a user or subscriber.

Queuing can also cause data integrity errors in a multiple-initiator configuration. An initiator that begins a data transfer command sequence to a tape drive operates on a presumption of specific state information concerning the drive, including media position. These presumptions are invalidated when queuing interleaves commands from different initiators. Command interleaving has the potential to change the drive's state, causing data transfer failure and possibly data corruption on the tape.

Queuing can also negatively impact performance. Interleaved commands that change drive state can disrupt performance by delays incurred while returning to the appropriate state. Even interleaved commands that do not change device state, such as inquiry and log sense commands, can potentially impact performance for tape drives having an optimization to operate in a faster mode for an uninterrupted sequence of data transfer commands.

Difficulties raised by multiple initiators in a Storage Area Network are addressed using various storage device management methods. Conventional management methods include access controls, switch zoning, SCSI reserve/release commands from initiators, and inquiry caching. Other methods include custom target reset handling in a router, dual initiator identifiers, imposing a requirement for homogeneous backup applications, and usage of management processes to manually protect a tape drive from tape resource requests by other activity during a backup/restore window. None of these methods is a general solution to all difficulties involved in usage of multiple initiators in a SAN. Predominantly, the improvement techniques were created and designed to solve other problems but have been found to have some utility in improving multiple initiator difficulties in some applications. Some methods, for example inquiry caching, address a common cause of availability problems, but fail to address other multiple-initiator difficulties. Even combinations of the various techniques are ineffective in handling the multiple initiator difficulties and generally only have utility in solving problems in special cases.

Management access controls enable enterprises to restrict management service access to a specific set of end points, for example IP addresses, device ports, or switch World Wide Numbers (WWNs). Access controls are typically implemented in router firmware and restrict access to devices behind the router to specified initiators. Access controls can disable front-panel access to switches, and manage device and switch connections. Device Connection Controls (DCCs) such as WWN Access Control Lists (ACLs) or Port ACLs enable binding of individual device ports to a set of one or more switch ports. Device ports are specified by WWN and typically represent Host Bus Adaptors (HBAs), also called servers. DCCs secure server-to-fabric connections to normal operations and management functions. DCCs bind a specific WWN to a specific switch port or set of ports to prevent a port in another physical location from assuming the identify of a WWN, controlling shared switch environments by enabling only an authorized set of WWNs to access particular ports in a fabric. Switch Connection Controls (SCCs) restrict fabric connections to a WWN-designated set of switches that are mutually authenticated for switch-to-switch connectivity, for example using digital certificates and unique public/private keying.

Access controls are generally useful to limit tape drive access to backup servers, blocking access to all other servers on the SAN. Access controls fail to address availability, data integrity, and performance issues because SANs can contain multiple backup servers and thus have multiple initiators.

Switch zoning is typically a feature implemented in switch firmware that is commonly used to restrict access to a router and library devices connected to the router to initiators at specified switch ports. Switch zoning is a SAN-partitioning technique that narrows traffic through a storage-networking device so that specific ports on a switch or hub can only access other specific ports. Switch zoning uses masking to the node port level for nodes that are accessible by a switch. Logical Unit Numbers (LUNs) attached to a port node can be masked from hosts that do not access that port. Switch zoning cannot mask individual LUNs arranged behind a port. Instead all hosts connected to the same port can access all LUNs address through that port. In essence, switch zoning converts the physical topology of a network to a logical representation consisting of multiple separate networks.

Fabric switches require any node that attaches to a switch to log in to the switch and register the node's World Wide Number (WWN) in the Simple Name Server (SNS) function of the switch, assigning a unique address to the WWN. Host drivers can detect targets through SNS lookup rather than surveying the entire network. The SNS can be zoned by WWN or by port. WWN zoning facilitates dynamic changes to suit conditions. For example, a tape library can be moved to different zones at various times to restrict access during backup. Also a node can be moved to a different port address without changing zones using WWN zoning.

Unfortunately, switch zoning can lead to a security breach by unauthorized usage of a WWN. Another difficulty is that switch zoning supports inators and targets that attach to a switch and does not assist security beyond port level of a storage subsystem. Switch zoning cannot mask LUNs from initiators that access the same storage port.

Switch zoning does not address issues of availability, data integrity, and performance because multiple initiators can still be zoned to access the library. Switch zoning may also restrict flexibility of the SAN by limiting the backup servers that can access backup devices. Switch zoning is typically difficult to manage and does not scale well as the SAN grows.

SCSI reserve/release commands directed to a SCSI switch can be used to share peripheral devices between two host computers. Either an operating system or backup application can issue reserve/release commands to reserve library devices for a single initiator. Generally the tape device and the router manage the reservation. Reservation of a peripheral device, such as a tape drive, using the SCSI reserve/release command, causes attempts to access the peripheral from other initiators to be rejected until the first initiator releases the peripheral device. Reserve/release commands typically have limited utility due to interoperability difficulties between different backup applications and different versions of the same backup application, and inconsistencies that result when servers use different operating systems. In addition to interoperability flaws, reserve/release commands can create problems when a server holding a reservation loses power or is rebooted, leaving the reserved device unavailable. Other difficulties include omission of reserve/release support in some operating systems. Furthermore, SCSI buses of two hosts cannot always be connected so that reserve/release support is unavailable.

An inquiry cache is a cache of inquiry responses allocated for individual devices. Inquiry caching generally runs in a router. The inquiry cache is used to establish connections between an initiator and a peripheral device, such as a tape drive. The cache for the peripheral devices holds requests from initiators and allocates access to the initiators. Inquiry caching is effective when a secondary server issues inquiry commands. However, inquiry caching is ineffective in facilitating availability, data integrity, and performance when secondary servers issue other commands, such as log sense.

Some systems use dual initiator identifiers, typically executing in a router, to attain availability via redundancy. For example, Random Arrays of Inexpensive Disk (RAID) systems with multiple host or dual-loop capabilities seek fault resilience by enabling access by multiple hubs or switch ports. Likewise, host adapters or initiators can attach to multiple switches or hubs for improved performance and redundancy. Systems can be arranged in dual-initiator/dual-bus or dual-initiator/dual-loop configurations. The dual-initiator/dual-bus configuration gives high availability by protecting against host failure. For example, each host can have two host bus adapters, each connected by a fibre channel loop to a separate peripheral in the storage system. Dual initiator identifier (IDs) are effective when the tape drive can handle untagged queued commands, but has been ineffective in that tape drives generally do not support untagged queuing.

Homogeneous backup applications typically require that all backup operations using a library are the same, regardless of initiator operating system. With or without the reserve/release command, a homogeneous application enables multiple initiators to intercommunicate, usually through a network interface, and coordinate tape device sharing. Although some systems may specify that backup applications are homogeneous, difficulties with availability, data integrity, and performance are not resolved. For example, if an administrator or script issues commands during a backup window that changes drive state, homogeneity is breached.

Some applications use management processes to manually ensure no other initiator conducts operations to a tape drive during a backup/restore window, effectively handling availability, data integrity, and performance issues if achievable. However, usage of management processes is difficult since protection of tape drive operations is difficult to scale well as the SAN changes or increases in size.

SUMMARY OF THE INVENTION

In accordance with an embodiment of a system capable of managing access to a physical device from among a plurality of initiators, an apparatus comprises a data path capable of coupling a physical device to a plurality of initiators. An interface is coupled to the data path and forms a command pathway between the plurality of initiators and the physical device. A controller is coupled to the data path and coupled to the interface. The controller comprises an executable process that creates a virtual device object that resolves conflicting concurrent attempts to access the physical device by a plurality of initiators. The virtual device object is capable of protecting state of the physical device during successive data transfer and media movement operations by emulating responses of the physical device and redirecting access to the physical device when the physical device becomes available.

In according with another embodiment, a system capable of managing access to a physical device from among a plurality of initiators comprises a virtual device capable of emulating at least one behavior of the physical device, a command filter, and a monitor. The command filter is capable of communicating with the plurality of initiators and selectively directing initiator requests to the physical device and the virtual device based on physical device state. The monitor is coupled to the command filter and the physical device and capable of determining state of the physical device and communicating a physical device state signal to the command filter.

In accordance with other embodiments, a system capable of managing traffic on a data path between a physical device and a plurality of initiators comprises a virtual device, a monitor, and a command filter. The virtual device is capable of emulating at least one behavior of the physical device. The monitor is coupled to the data path and is capable of analyzing multiple conditions in a background process that extracts a physical device state parameter from the multiple conditions. The physical device state parameter directs filtering of the command filter. The command filter is capable of alternatively directing commands to the virtual device and the physical device based on the physical device state parameter.

In accordance with further embodiments, a method of managing access of a plurality of initiators to a physical device comprises monitoring requests from the plurality of initiators to the physical device and status of the physical device. The method further comprises determining whether the physical device is bound to one of the plurality of initiators, creating a virtual device that emulates at least one action of the physical device, and directing a request from an unbound initiator to the virtual device if the physical device is bound.

BRIEF DESCRIPTION OF THE DRAWINGS

Embodiments of the invention relating to both structure and method of operation, may best be understood by referring to the following description and accompanying drawings.

FIGS. 9A and 9B are command tables that depict behavior of a virtual tape LUN in response to primary commands and streaming commands.

FIGS. 10A and 10B show an example of a table of data in a template that corresponds to a high-availability device application.

DETAILED DESCRIPTION

Figure 1:
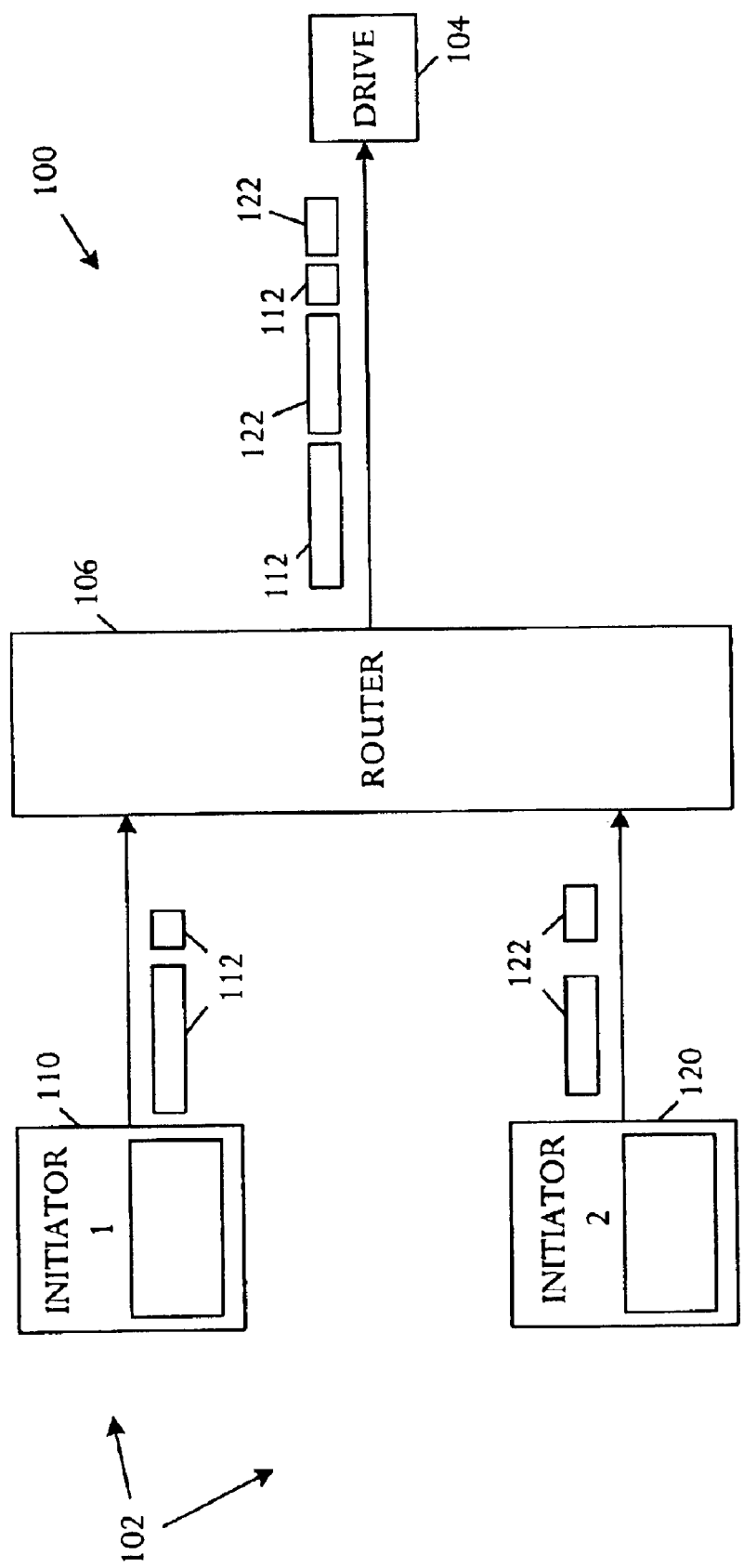
FIG. 1 is a schematic block diagram showing a command-and-data interleaving operation of a Storage Area Network (SAN) for which the system disclosed herein improves performance.

In storage area networks (SANs), resource conflicts and difficulties arise when multiple initiators, also called servers or hosts, share access to a single storage resource, for example a tape drive or disk drive, in a library. Resource conflicts in the multiple-initiator environment can lengthen command processing time, possibly creating availability and data integrity problems. Resource conflicts can also cause the resource state to change without notification among initiators. The resulting difficulties can be serious and include data transfer errors, data integrity failure, and performance degradation.

Embodiments of the disclosed storage system reduce data transfer errors through LUN virtualization in a multiple-initiator environment by introducing a virtual LUN object into a storage system component or device, such as a router. Embodiments comprise a command filter and LUN monitor that operate in combination to reduce data transfer errors arising from conflicting commands and task management directives in a multiple-initiator environment through creation of a virtual LUN object. Virtualization can eliminate conflict resolution through physical LUN command queuing and protects the physical LUN state through successive data transfer and media movement operations. Embodiments of the virtualization can be implemented in a storage system element, such as a router, in a manner that requires no configuration changes other than connection to supported hardware.

Embodiments of LUN virtualization address command timing requirements, thereby avoiding much of the error handling that can change device state, possibly cascading the incidence of error handling that reduces availability, data integrity, and performance. LUN virtualization also actively protects drive state when error handling does occur and/or when inadvertent commands change device state.

Embodiments of a storage system comprise a dynamic command filter that can filter commands based on physical device state. The command filter redirects commands intended for operation on a physical device to another target based on the current state of the physical device. Dynamic state filtering based on physical device state can flexibly respond to device workload and traffic, in contrast to filtering techniques based on static data, such as world wide number (WWN), source identifier (ID), or command type. The command filter samples information from multiple sources to determine the current state of the physical device, and passes through or redirects commands based on the determined state.

Embodiments of a storage system comprise a monitor that obtains state information relating to a storage device based on intelligent sampling techniques. Device state can be determined by polling, but polling may be inaccurate if multiple initiators control the device. Embodiments of the monitor replace or supplement polling by intercepting incoming and/or outgoing traffic from the device and sampling the intercepted traffic to determine device state. The monitor typically polls the device for desired information when sampling does not supply the information within a suitable time to maintain integrity of a data structure containing the device's state.

In various embodiments, the illustrative storage system prevents availability errors by responding to management commands and task management operations such as target reset operations with a virtual response on behalf of the target drive within the timeout period. A virtual target device responds to commands by informing the router of target drive state with respect to the first initiator, intercepting commands from subsequently acting initiators, and responding to the subsequent initiators without queuing. The virtual target device responds to task management operations by emulating, also called spoofing, the target drive's state for initiators that issue task management operations.

In various embodiments, a storage system may perform one or more of several functions to improve availability, data integrity, and performance. The system can protect the state of the drive when engaged in a data transfer or media movement commands with a primary initiator. The system can avoid unnecessary error recovery and task management traffic, and maintain optimum performance, by supplying expected management data within expected timing specifications to secondary initiators. The storage system can prevent or reduce introduction of new problems for operating systems or backup applications by maintaining the drive's interface specification.

In some embodiments, the system performs a method for detecting when a data storage device is executing a sequence of data transfer or media movement commands in response to an action of a first initiator, and intercepting actions from other initiators while the sequence is active. The method can be executed in a router or other device or component with suitable communications access to the storage drive. The storage drive can be a tape drive or other suitable storage device with similar timing conditions and constraints.

Referring to FIG. 1, a schematic block diagram depicts a command-and-data interleaving operation of a Storage Area Network (SAN). An illustrative portion of a SAN 100 is shown that includes a plurality of initiators 102 that send information, including commands and data, to a storage drive 104 via a router 106. A first initiator 110 sends commands and data 112 to the router 106 as a second initiator 120 sends data and commands 122 with at least some timing overlap or simultaneity of the transmission strings. The router 106 queues the commands and data in a manner so that commands and data from the two initiators are interleaved.

Figure 2:
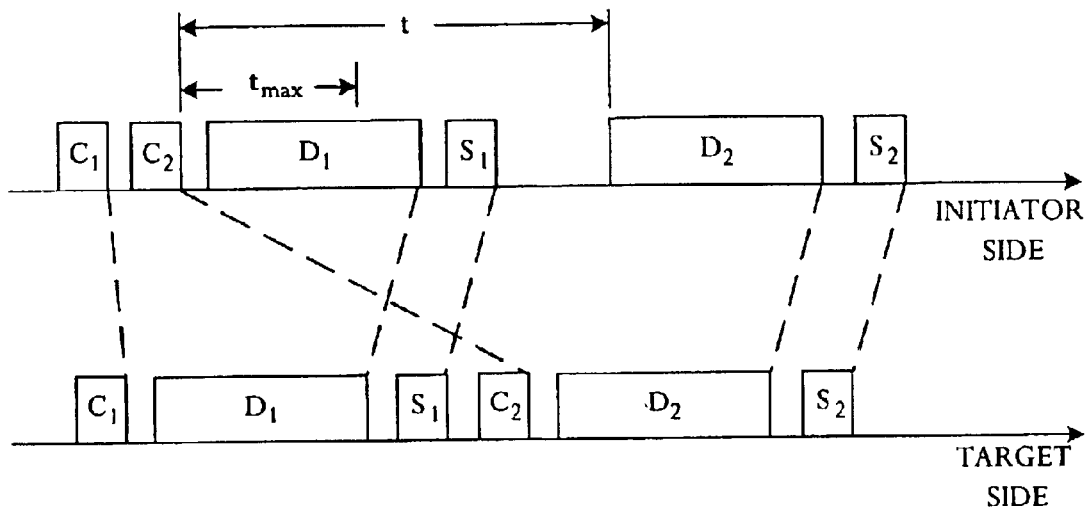
FIG. 2 is a schematic timing diagram showing a timing problem that can arise when multiple initiators request access to a target storage resource.

Referring to FIG. 2, a schematic timing diagram shows a timing problem that can arise when multiple initiators request access to a target storage resource with some timing overlap. The diagram shows command C, data D, and status S time blocks on the initiator side of a router and the command C, data D, and status S time blocks as passed to the target on the router's target side. System availability can be a problem due to error recovery operations of an initiator. An initiator that issues an action or command waits for acknowledgement for a predetermined time-out period. The initiator invokes an error recovery when acknowledgement is not received by the end of the time-out period.

In the timing diagram, a first initiator issues a command $C_1$ and shortly thereafter a second initiator issues a command $C_2$. The target storage device receives the command $C_1$ and responds with data $D_1$ directed back to the first initiator. While the target storage devices is handling the first request, command $C_1$, the second initiator expects an acknowledgement in response to command $C_2$, a response not forthcoming due to prior occupation of the target device. When transfer of data $D_1$ is complete, the target finishes the transaction with status $S_1$. The target device then receives the delayed command $C_2$ and responds with data $D_2$ and status $S_2$. The availability problem arises when the second initiator does not receive acknowledgement data $D_2$ due to the target's preoccupation with the first initiator transaction. After time $t_{max}$ the second initiator, assuming sole ownership of the target storage device, can respond by resetting the target device, an action having significant probability of terminating or disrupting the first initiator's transaction.

The second initiator's timed-out command can be a low priority management operation such as an inquiry, log sense or test unit ready command, and the first initiator's disrupted command a critical data transfer operation, for example a read, write, rewind, or load/unload. This and similar cases of improper management and prioritization are common in systems that process multiple requests from multiple initiators.

In a specific example, a router processing a READ command $C_1$ from the first initiator receives and queues a LOG SENSE command $C_2$ from the second initiator. Second initiator expects data in time interval $t_{max}$ but the actual required time due to queuing is time t. Timeout results in error recovery requested by a second initiator. In some systems, second initiator may issue a target reset, thereby disrupting and terminating the first initiator sequence before completion. Reset is not queued but instead is immediately sent to the target drive, and thus prevent the drive from responding with status $S_1$ to the first initiator. The router accordingly will fail the READ command and the entire operation or sequence utilizing the command will fail.

Figure 3:
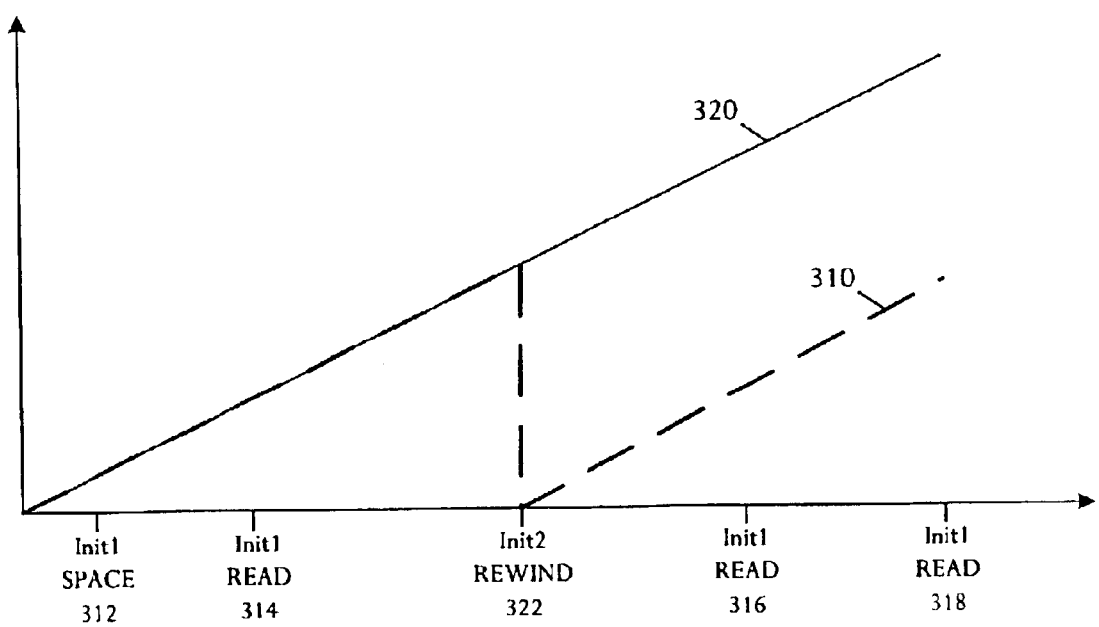
FIG. 3 is a graph showing a progression of storage media position in response to an example of a command sequence.

Referring to FIG. 3, a graph shows a progression of storage media position in response to an example of a command sequence. The graph compares actual 310 and assumed 320 media positions when media positioning commands are interleaved. The consequences to availability described hereinabove for management commands interleaved with data transfer operations also have deleterious consequences for data integrity. If a data transfer operation is in progress when another initiator issues a media movement command, data integrity can be compromised since the media position assumed by one initiator is invalid.

For example, a first initiator can issue a SPACE command 312 and a READ command 314 that cause actual and assumed progression of the media. The first initiator assumes that the progression will continue. If a second initiator issues a command, for example a REWIND command 322, the actual media position changes in a manner not assumed by the first initiator. Subsequent first initiator commands, such as READ commands 316 and 318, are assumed by the initiator to access data from known positions on the media. In actuality, data is read from locations on the media different from the assumed locations, resulting in reading of incorrect data.

In various embodiments, the illustrative storage system prevents data integrity errors by determining when a target drive is active in response to a command from a first initiator and protecting the target drive from subsequent accesses using one or more protection options. For example, the system prevents other initiators from accessing media in the target drive when the drive is already active, rejecting media movement commands from other initiators, and emulating the media movement commands from other initiators. The various protection options may be activated in selected circumstances or conditions.

Conflicting commands and requests from multiple initiators can also impact performance. For example, some high-performance storage media devices implement a 'fast mode' data transfer. In a representative implementation, the fast mode is enabled upon receipt of three consecutive READ or WRITE commands. When activated, the fast mode moves data via hardware directly from a Small Computer Systems Interface (SCSI) to the drive's internal buffers, bypassing drive firmware. In the fast mode, receipt of a non-data transfer command will disengage fast mode, thereby reducing performance. For example, interleaving of data movement commands with management commands from another initiator will disengage fast mode.

Referring again to FIG. 1, some embodiments of a SAN 100 implement tools such as executable methods, processes, procedures, and the like, executable in a processor, central processing unit (CPU), computer, digital signal processor, programmable logic array, state machine, or the like, capable of detecting drive state and command filtering. In various of these embodiments, the state detection and command filtering operations, functions, or actions can be implemented utilizing existing drive interface specifications. For example, the router 106 can continue to send commands to the storage drive 104 if the storage drive 104 is not engaged with another initiator 102. The storage drive 104 is bound to an initiator 102 for the duration of a command. If the command is determined to be part of a data transfer or media movement sequence, binding is maintained until the sequence is complete. While a binding is in effect the router 106 either rejects commands from other initiators 102 or the router 106 functions as a virtual Logical Unit Number (LUN) and services the command, depending on the particular command or other conditions and circumstances. The proactive response of the router 106 effectively eliminates queuing. Every command is serviced, either by a physical LUN, the storage drive 104, or a logical LUN, the router 106.

Other tools implemented in the SAN 100 execute task management and session management operations directed to the physical LUN. The tools determine whether a management operation will interfere with other initiator's traffic. If the tools detect a conflict, the task management operation either is rejected, or the operation is serviced locally by the router 106. If no conflict is detected, the task management operation is passed to the physical device for completion.

Figure 4:
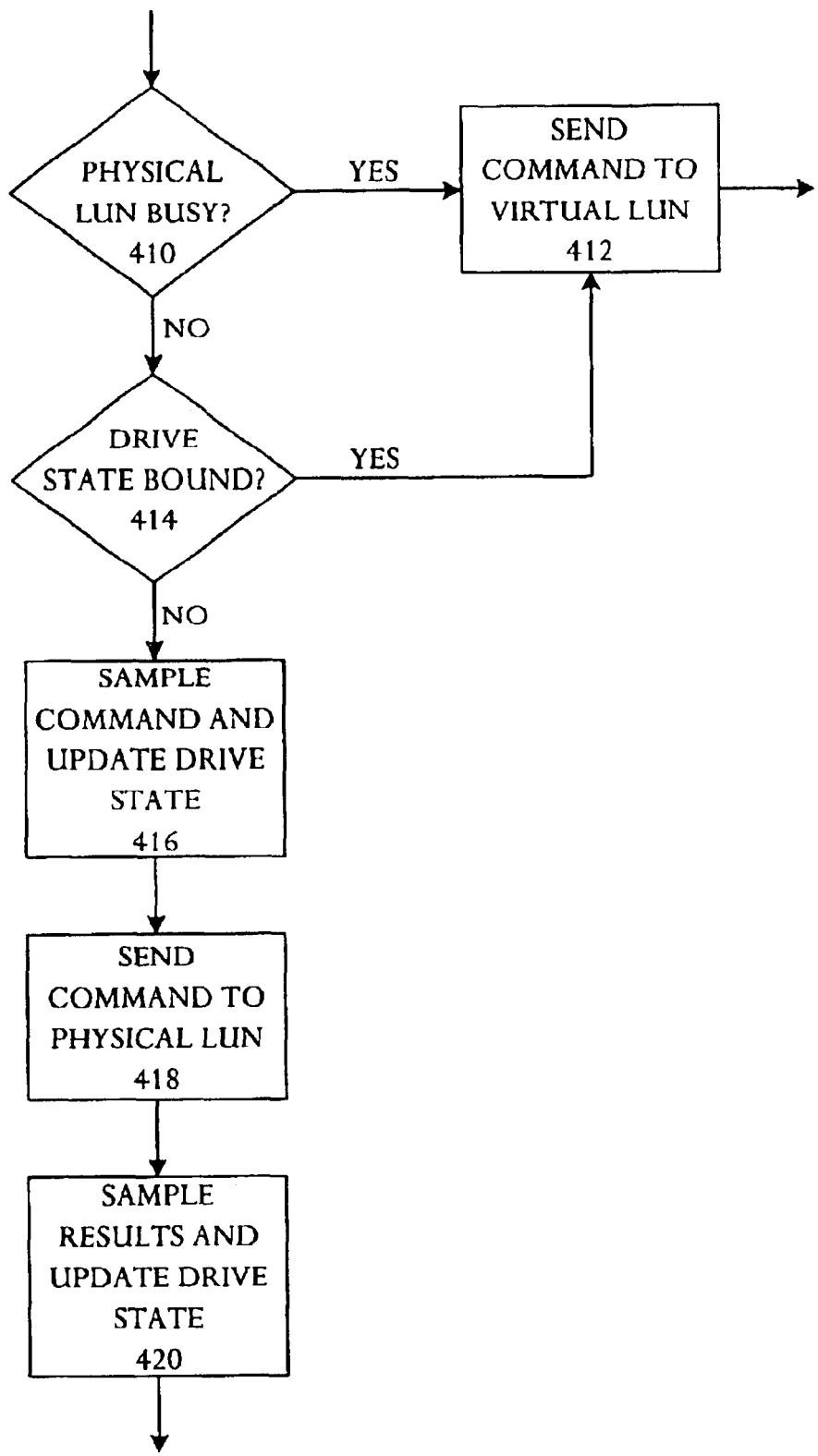
FIG. 4 is a flow chart showing operations of an embodiment of a technique for dispatching commands from a second initiator when a virtual device LUN is available.

Referring to FIG. 4, a flow chart shows operations of an embodiment of a technique for dispatching commands from a second initiator when a virtual device LUN is available. An executable process, method, procedure, or the like, for example executing in the router, detects whether a physical LUN is busy with another server 410. If the physical LUN is busy, the operation sends the command to the virtual LUN 412. If the physical LUN is not busy, the operation determines whether the drive state is bound 414. If the drive state is bound, the operation also sends the command to the virtual LUN 412. If the drive state is not bound, the operation samples the command and updates the drive state accordingly 416 to determine when the physical drive is available. When the physical drive is available, the operation sends the command to the physical LUN 418. The operation samples results and updates the drive state 420.

The action of determining whether the drive state is bound 414 is useful for determining accessibility of the drive. Many conditions are events that affect the bound state. Examples of bound state events include binding on detecting media movement to the drive, such as by intercepting commands to robotics in a storage system that actuate mechanical movements, as well as commands to the drive. Some systems can determine whether a device is loaded with media. Presence of media is an indirect indication that the device is bound.

In various embodiments, a system can intercept commands to robotic components in a storage unit, parse the command to determine how the command or directive will impact hardware availability, and respond accordingly. Intercept of a LOAD command typically indicates that an initiator, server, or host requests exclusive access to a device. Loading of media binds a LUN to an initiator. When a device is bound and other initiators attempt to access the device, the system intercepts the commands requesting access from the other initiators and prevents contention in some manner. In various circumstances and conditions, the system can resolve contention, for example by denying the request or virtualizing access to the device. The resolution technique may depend on the resources available for contention resolution. In some circumstances, the request may be queued.

Another binding event is binding on detecting a LOAD UNLOAD command to a drive that was previously unloaded. Some drives perform an auto-load on media insertion, and applications do not always explicitly send the LOAD UNLOAD command with the LOAD field set. Also, some robotics controllers explicitly send a LOAD UNLOAD command via an Automation Control Interface (ACI) port so that the operation intercepts the ACI port. Alternatively, the system can utilize events other than the LOAD UNLOAD command to activate binding.

Binding can also be indicated by detecting a long sequence of TEST UNIT READY commands to a drive. Another binding event is a REWIND command. An operation can classify a rewind as a binding event. Most applications rewind immediately after the media is loaded. Other binding events include detection of specific, unique, repeatable sequences of commands. An operation can customize a binding trigger for a particular application and backup profile. Selection and customization of a binding trigger can utilize a manageability path to enter and edit the sequence for a particular configuration.

Various embodiments of the disclosed system can also detect unbinding events. One example of an unbinding event is detection of a LOAD UNLOAD command when the LOAD field is cleared in a drive's status register. Unbinding occurs on successful command completion. Examples of unbinding state events include unbinding on detecting media movement from the drive, such as by intercepting commands to robotics in a storage system that actuate mechanical movements, as well as commands to the drive. Other unbinding events include detection of specific, unique, repeatable sequences of commands. An example of a command sequence is a message to drive robotics to LOAD media, a message to the drive begin a backup operation, and a message to the robotics to UNLOAD media following the backup operation. Commands from other initiators requesting access during the backup sequence can be virtualized, addressed by a virtual LUN, to resolve contention for the drive. In some circumstances, for example for particular commands or directives that cannot be addressed by delay and subsequent request, the system returns a rejection message. In other circumstances, the system stores the request and passes the request to the physical LUN when available.

An operation can customize an unbinding trigger for a particular application and backup profile. Selection and customization of an unbinding trigger can utilize a manageability path to enter and edit the sequence for a particular configuration.

Other embodiments and implementations of a SAN 100 expand functionality by modifications and extensions to the interface specification for a virtual drive. Various implementations may include changes to one or more of router software and/or firmware, router hardware, application software and/or firmware, and operating systems. Management commands can be handled by the router 106, which maps the management commands into similar functionality in the physical drive. The physical drive can be any suitable storage device, such as a tape drive, a disk drive, optical drives of various types, and the like, or can be a combination of drive types.

Figure 5:
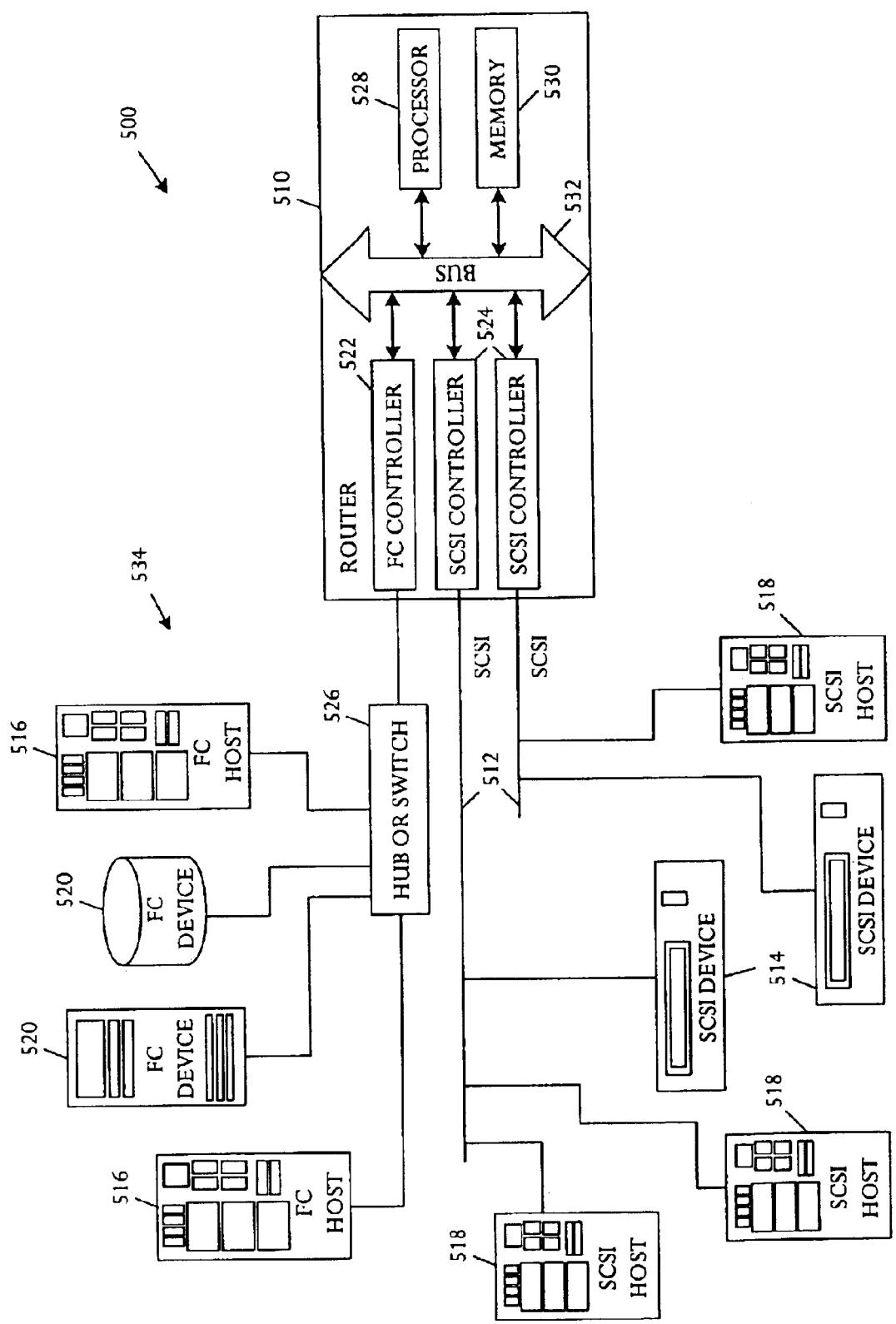
FIG. 5 is a schematic block diagram showing an embodiment of a router for usage in a storage system, such as a storage area network (SAN) according to the present invention.

Referring to FIG. 5, a schematic block diagram shows an example of a router 510 for usage in an embodiment of a storage system 500 such as a storage area network (SAN). The router 510 enables bi-directional connectivity for narrow, wide fast, and ultra-2 Small Computer Systems Interface (SCSI) buses 512 in either a Fibre Channel Switched Fabric (FC-SW) or a Fibre Channel Arbitrated Loop (FC-AL) environment. The router 510 can translate Fibre Channel Protocol (FCP) to and from SCSI protocol, and transfers commands, data, and status information to and from Fibre Channel hosts 516 and devices 520 and SCSI hosts 518 and devices 514. The router 510 supports Fibre Channel hosts 516 and SCSI hosts 518 as initiator devices. The router 510 also supports Fibre Channel devices 520 including direct access devices such as Random Array of Inexpensive Disk (RAID) controllers, disk drives, Just a Bunch of Disks (JBOD), and the like. SCSI devices 514 include sequential access devices such as tape drives, tape libraries. Various SCSI devices 514 and Fibre Channel devices 520 include tape and magneto-optical libraries. Fibre Channel hosts 516 and devices 520 communicate to the router 510 via a hub or switch 526.

In other embodiments, for example future implementations, the illustrative system can be used in fibre-to-fibre routers, and Internet SCSI (iSCSI)-to-SCSI applications. Accordingly, the illustrative system and techniques can be used according to standards other than the illustrative fibre channel-to-SCSI implementation.

The router 510 typically has multiple controllers including at least one Fibre Channel Controller 522 and at least one SCSI Controller 524 for communicating via Fibre Channel and SCSI buses 512, respectively. The router 510 further comprises a processor 528 that controls operations of the router 510 and a memory 530, for example a volatile memory and a nonvolatile memory. The processor 528 controls operations of the Fibre Channel and SCSI controllers 522 and 524 via communications on an internal bus 532.

The router 510 converts Fibre Channel host protocol to SCSI device protocol in response to encapsulated FC protocol command packets issued from a Fibre Channel host 516 to the router 510. The router Fibre Channel Controller 522 interprets the Fibre Channel information and places the packet in a buffer memory 530. The processor 528 interprets the Fibre Channel information packet and programs the router SCSI Controller 524 to process the transaction. The router SCSI Controller 524 sends the command to the target SCSI device 514, and the SCSI device 514 interprets and executes the command.

In a SCSI to Fibre Channel protocol process, the initiator is a SCSI host 518 on the SCSI bus 512 that issues commands so that the information is passed through the router 510 to a target on the Fibre Channel Storage Area Network (FC-SAN) 534. The SCSI host 518 issues a command to the router 510. The router, SCSI Controller 524, interprets the command and places the interpreted command in the buffer memory 530. The processor 528 interprets the data and programs the router Fibre Channel Controller 522 to process the transaction. The router Fibre Channel Controller 522 translates the data into an FC protocol packet and sends the packet to the target Fibre Channel device 520. The target Fibre Channel device 520 interprets the FCP protocol packet and executes the command.

A storage system 500 can be configured as many different topologies and arrangements depending on the particular application. Often additional devices and components are added as capacity expansion is desired. One suitable type of topology is a cascaded fabric with a string of switches or levels of switches connected by one or more hubs or switches. Another suitable type of topology is a meshed fabric in which all switches are interconnected so that at least two paths or routes from any one switch to another exist in the fabric. A ring fabric is a continuous ring of switches connected into a single fabric. A backbone fabric has one or more switches acting as a fabric backbone connecting with other switches within the fabric so that the backbone switches function as routers with full bandwidth and redundant connectivity to all other switches. Other types of topologies are possible. Embodiments of the illustrative system are used in topologies that include multiple initiators capable of simultaneously accessing or attempting to access a storage device.

Figure 6:
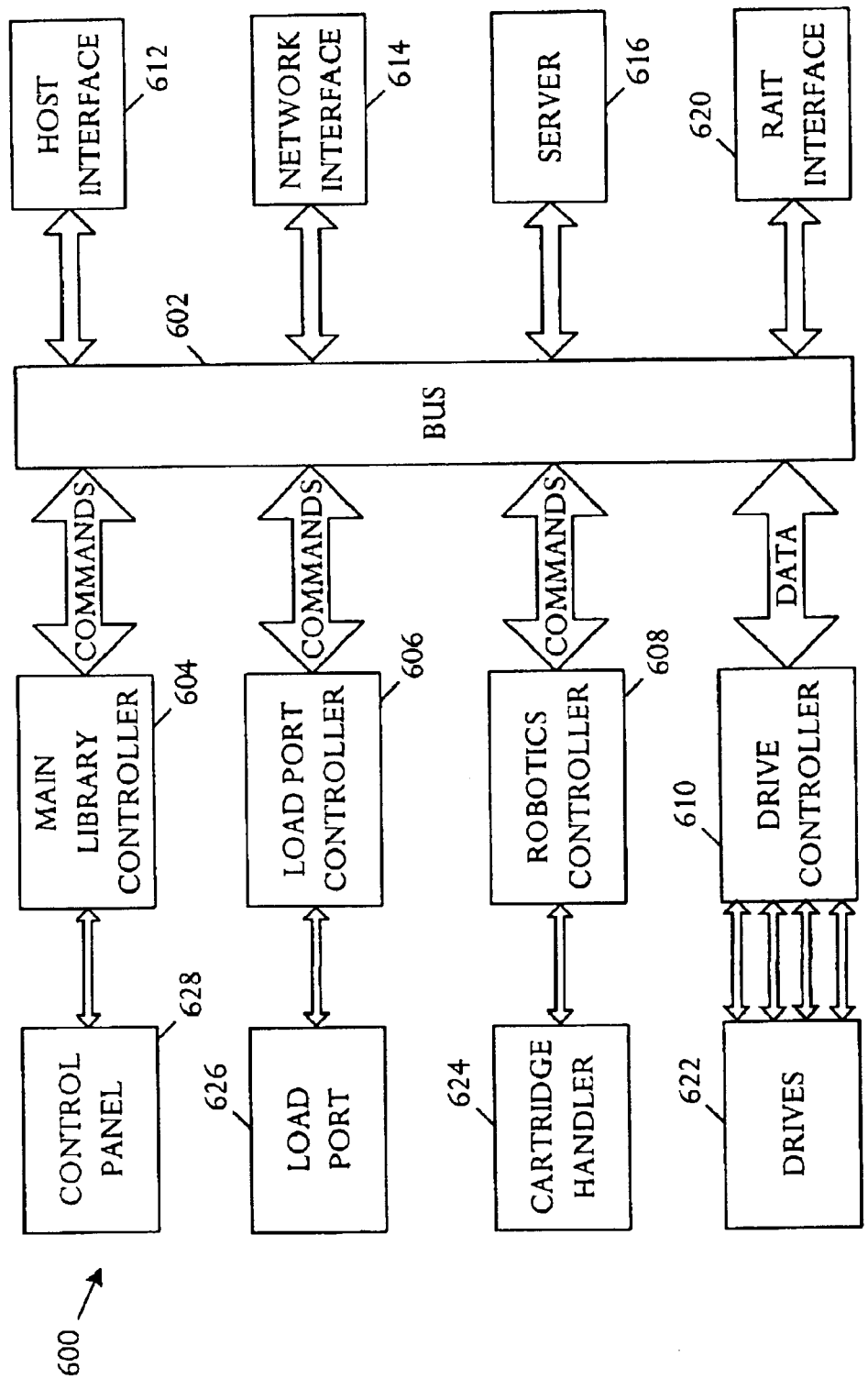
FIG. 6 is a schematic block diagram showing an embodiment of a suitable storage device for usage as a Logical Unit Number (LUN) according to the present invention.

Referring to FIG. 6, a schematic block diagram shows an example of a storage device 600 for usage as a Logical Unit Number (LUN). The storage device 600 can be any type of storage device such as a drive or library. Some storage devices 600 can be tape drives or tape libraries, others can be disk drives or forms of optical storage drives. The storage device 600 can be operated using industry standard software or custom software as a direct attached device or as part of a multiple-server system.

The storage device 600 incorporates a bus backplane such as a PCI bus backplane to interface with multiple various types of devices, systems, or components. For example, the storage device 600 can include a bus 602 with connections to a host interface 612, a network interface 614, a server 616, and a Redundant Array of Inexpensive Tapes (RAIT) interface 620. The host interface 612 can support connectivity to various links including SCSI, Ultra-SCSI, Ultra-2 SCSI, Gigabit Ethernet, Fibre Channel, and others, enabling connection directly to Fibre Channel backup servers and networks with additional fibre channel adapter cards. The network interface 614 can connect directly to networks with the addition of PC-Ethernet, Peripheral Component Interconnect-Fiber Distributed Data Interface (PCI-FDDI) and Peripheral Component Interconnect-Asynchronous Transfer Mode (PCI-ATM) cards. The server 616 interface can accommodate single card processors or CPUs or be used as a network-attached storage device. The RAIT interface 620 enables support of fault tolerance through auto-tape copy, mirroring, and tape stripping with parity by adding tape RAIT cards.

The storage device 600 has multiple controllers that control and manage various electrical or electro-mechanical components. The controllers can include a main library controller 604, a load port controller 606, a robotics controller 608, and a drive controller 610. The drive controller 610 communicates with multiple storage drives 622 and controls multiple operations including data routing, drive utilization, and drive failover. The main library controller 604 is a system controller that performs multiple various control, management, and monitoring operations including multiple-host and library partitioning, serial communications control, diagnostics, and data pass-through. For example, the main library controller 604 supports system administration via connection to a control panel 628 such as a graphical user interface (GUI) touch screen for facilitating operational functionality, configuration, fault determination, diagnostic testing, and network access, such as a web interface as a GUI option.

The load port controller 606 communicates with a load port 626 and manages entry and exit of data cartridges into the storage device 600. In one example, the load port 626 can include one or more multiple cartridge removable magazines to facilitate cartridge import and export and off-site data storage.

The robotics controller 608 communicates with robotics such as a cartridge handling mechanism 624 that carries data cartridges between storage slots, the storage drives 622, and the load port 626.

Commands received from the various interfaces, the host interface 604, network interface 606, server 608, and RAIT interface 610 can control operations of at least the storage drives 622 and the robotics 624.

Figure 7:
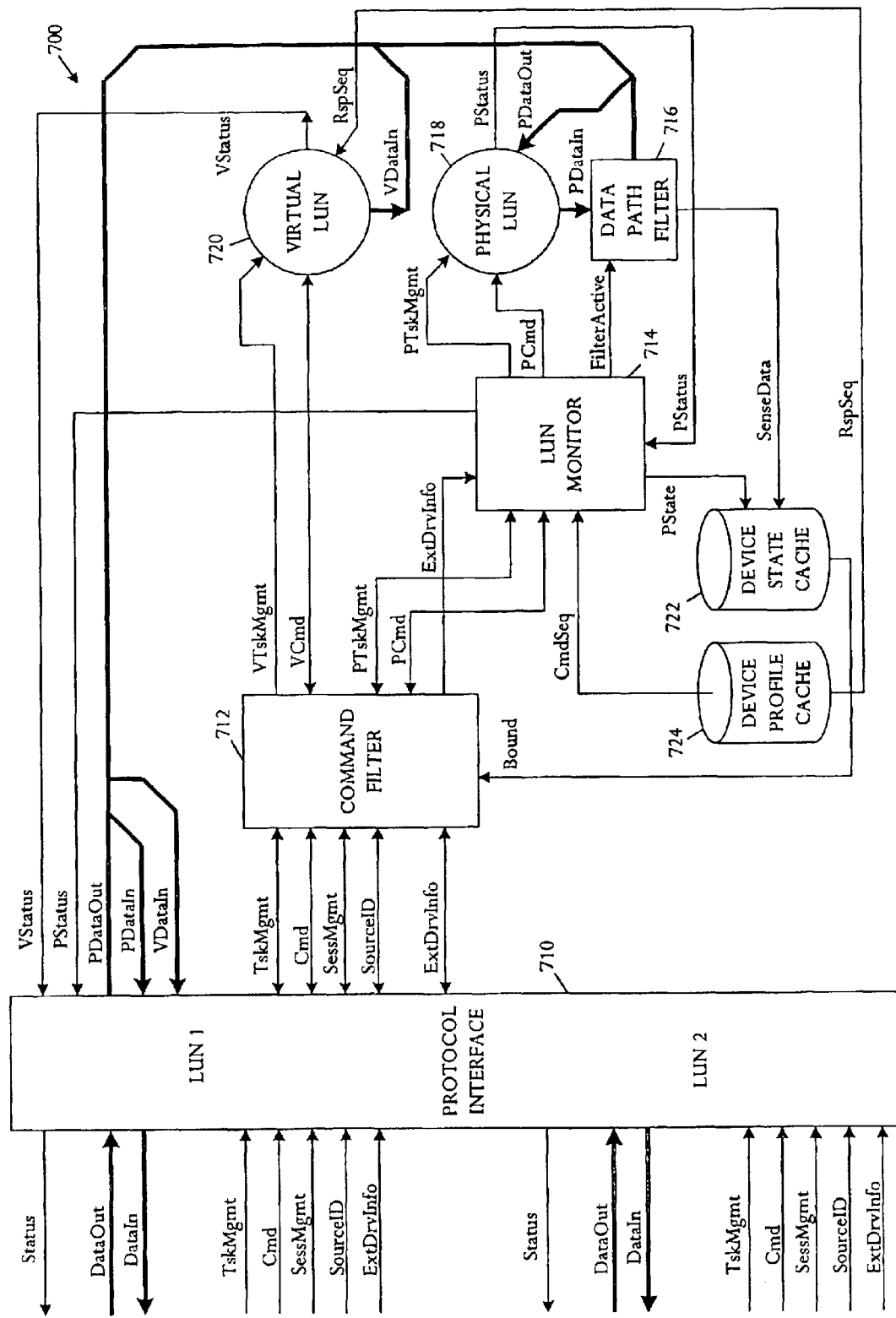
FIG. 7 is a schematic block diagram illustrates an embodiment of a storage system comprising router elements according to the present invention.

Referring to FIG. 7, a schematic block diagram illustrates a LUN virtualization system 700. The LUN virtualization system 700 can, for example, be implemented in a router. Such a router is highly suitable for implementing virtualization because virtualization typically includes interception of messages and message traffic generally passing through the router. In other embodiments, the LUN virtualization system 700 can be implemented in other devices, components, or systems such as switches, hubs, storage devices, storage libraries, servers, hosts, and the like. In some embodiments, the illustrative LUN virtualization system 700 can be implemented as firmware components that are capable of executing on a processor or controller in a router or other device. The block diagram for a LUN virtualization system 700 shows components and data flows for a single LUN. The data path is shown in bold lines. LUN virtualization system 700 can be duplicated for each LUN supported by the router or other device.

One embodiment of the LUN virtualization system 700 comprises a protocol interface 710, a command filter 712, a LUN monitor 714, a data filter 716, a physical LUN 718, a virtual LUN 720, a device state cache 722, and a device profile cache 724.

The protocol interface 710 performs virtual/physical mapping to facilitate virtualization of storage LUNs. The protocol interface 710 receives commands and configures information blocks for transmission, for example by matching status to the correct command, and supplying header information for status frames. The protocol interface 710 also handles initiator protocol, for example by obtaining unit attention of the first access of an initiator. The protocol interface 710 can manage signals from multiple LUNs. The protocol interface 710 serves as a common interface point for external communications.

In one specific example, the protocol interface 710 can perform Fibre Channel to Small Systems Computer Interface (SCSI) conversion, receiving command packets from a host, stripping header and extraneous information, and passing a SCSI command. For returning information, the protocol interface 710 saves at least some of the stripped information and repackages the return information into suitable form for sending back to the host.

The command filter 712 receives commands and task management directives, and determines how and when a physical device acts on the commands and directives. The command filter 712 also determines whether commands are directed to a virtual LUN or the physical LUN. If a device is bound, commands from the binding initiator are passed through to the physical LUN and commands from other initiators are either rejected or handled by the virtual LUN, depending on the command, conditions, and circumstances. In a specific illustrative example, the command filter 712 handles SCSI commands such as ABORT, RESET, TARGET RESET, ABORT TASK, ABORT COMMAND SET, and others.

The illustrative command filter 712 is a dynamic filter that filters information based on the state of a monitored device and can constantly update filter parameters as the state changes. The command filter 712 quickly and efficiently filters commands and task management directives to direct the commands and task management directives selectively to a LUN, for example to either the physical LUN 718 or the virtual LUN 720. The system constantly analyzes multiple conditions in a background process that extracts a single parameter, device state, from the conditions and the single parameter is the basis for filtering decisions. In the illustrative embodiment, the LUN monitor 714 executes the background process.

The command filter 712 also performs initialization for LUN virtualization. On system powerup and possibly other conditions, the system begins with no known state, no starting information. The initialization procedure collects information for storage in the device state cache 722 to enable LUN virtualization. In one embodiment, the command filter 712 calls for initialization and the LUN monitor 714 accesses storage elements in the device state cache 722 and determines that no state is defined. The LUN monitor 714 accesses the device profile cache 724 to fill storage elements in the device state cache 722.

The LUN monitor 714 issues commands to the physical LUN and captures status and some data from the physical LUN. The LUN monitor 714 maintains and ensures integrity of the device state cache. The LUN monitor 714 intercepts sense and log data from incoming commands to maintain accuracy of the device state cache, thereby maintaining the data structure containing the device state. The LUN monitor 714 also generates sense and log commands, if appropriate, to refresh the device state cache 722. Device specific command sequences can be resolved by using the device profile cache 724.

The LUN monitor 714 can intelligently monitor command and task management directive traffic to continuously update device state. The LUN monitor 714 intercepts state information that becomes available as the physical LUN 718 performs commands requested by a host or initiator, and updates the device state cache 722 based on the intercepted state information. Accordingly, the LUN monitor 714 can update state passively without issuing commands to the LUN and thereby increasing extraneous traffic. The physical LUN 718 produces status information PStatus as a result of performance of a command. The LUN monitor 714 can access PStatus and determine whether the information is useful for tracking and, if so, store or update information in device state cache 722. By updating information by passively tracking PStatus from externally-requested commands rather than actively requesting commands, the LUN monitor 714 can refresh the device state cache 722 without increasing command traffic to the physical LUN 718.

The LUN monitor 714 generally functions on the basis that a set of information is desired to describe conditions and operations of a device or LUN. Much of the information can be captured by passively monitoring traffic between an initiator and the LUN, including command, task management, data, and status traffic. The LUN monitor 714 can refresh information that is not captured within a suitable interval by issuing supplemental commands to the physical LUN. In the illustrative embodiment, the device state cache 722 stores desired information and the device profile cache 724 defines the information to store.

The LUN monitor 714 accesses information from the device profile cache 724 that identifies information to maintain in the device state cache 722. LUN monitor 714 tracks updating of the information and determines when information is to be refreshed, either because the information is unavailable or dated. When refresh is due, LUN monitor 714 can directly request information by issuing commands to the physical LUN 718. Device profile cache 724 contains various management information including identification of information that need not be updated once set, refresh rates for particular information, and the like. Some information may evolve at different rates. LUN monitor 714 can adapt refresh rates according to dynamically changing aspects of LUN operation.

The data filter 716 filters the data path for sense and log data. The data filter 716 enables access to data to monitor control information. For example, LOG PAGE and MODE PAGE information may be useful to track state. The data filter 716 enables filtering of the data path to access control information, for example copying information from the data path, while introducing only a small time delay. The data filter 716 becomes inactive, or transparent, when filtering is not desired. Data filter 716 can thus be implemented for low impact to the data path, thereby reducing delay in data passing through the filter. Most control information is obtained from status, PStatus, and not from the data path, so that the data filter 716 can often be inactive. When active, the data filter 716 passes through information with no change to the passing information, precisely maintaining data integrity.

While physical LUN 718 is the driver for the physical drive or physical LUN, virtual LUN 720 is an emulator for the physical LUN and resolves device specific response sequences using the device profile cache 724. The virtual LUN 720 can emulate one or more behaviors of the physical LUN 718 and can respond to command directives. Examples of command directives include LOG SENSE, MODE SENSE, RECEIVED DIAGNOSTICS, INQUIRY, and others. The virtual LUN 720 is configured in the image of the physical LUN 718. In some embodiments, the amount of storage for the virtual LUN 720 can be limited so that the virtual LUN cannot receive large data quantities. In such embodiments, the virtual LUN 720 can source data because the supplied data is generally small, for example information stored in the device state cache 722 such as log pages and maintenance information. Embodiments with a large storage capacity can have greater capability to generate and receive data.

The device state cache 722 is a volatile memory or storage that stores information for making a real-time determination of whether a physical LUN is bound. In some embodiments, drive firmware modules hosted by the router can manage the device state cache 722.

The device profile cache 724 is typically a non-volatile memory or storage that stores command and response sequences for emulating a specific drive type. In some embodiments, drive firmware modules hosted by the router can implement the device profile cache 724.

The protocol interface 710 handles multiple signals in operation as a common interface for external communications. The protocol interface 710 receives task management information (TskMgmt) as incoming task management directives from various devices, illustratively a first LUN and a second LUN. Task management directives include TARGET RESET, Automatic Contingent Allegiance (ACA) task attribute, and ABORT TASK. The protocol interface 710 passes task management directives to the command filter 712 and may also receive task management directives in return from the command filter 712. Protocol interface 710 also receives incoming commands (Cmd) from the LUNs and passes the commands through to the command filter 712. The protocol interface 710 receives incoming session management (SessMgmt) directives from the LUNs, for example including LOGIN and LOGOUT directives. The protocol interface 710 passes the session management directives to the command filter 712 and also receives return session management directives from the command filter 712. Protocol interface 710 receives source identifier (SourceID) information from the LUNs and passes the information to the command filter 712. Other information from the LUNs to the protocol interface 710 includes extra drive information (ExtDrvInfo), information about drive state from external sources. For example, some libraries issue LOAD UNLOAD commands over the Automation Control Interface (ACI) port. Protocol interface 710 passes ExtDrvInfo to the command filter 712.

The protocol interface 710 is an interface to the data path including Data input (DataIn) lines to an initiator and data output (DataOut) lines from the initiator. DataIn are resolved by the protocol interface 710 from PDataIn, data read from the physical LUN, or VDataIn, data read from the virtual LUN. DataOut are resolved by the protocol interface 710 from Status information that is returned from either physical LUN 718 or virtual LUN 720. Status returns to the initiator via the protocol interface 710 from either the virtual LUN 720 or the physical LUN 718. The protocol interface 710 resolves Status from either VStatus or PStatus.

The command filter 712 operates upon the incoming commands Cmd, task management directives (TskMgmt), and session management directives (SessMgmt) from the initiators and filters the commands and directives to pass commands to the physical LUN 718 and the virtual LUN 720. The command filter 712 passes physical commands (PCmd) and physical task management commands (PTskMgmt) to the physical LUN 718. Command filter 712 determines task management handling by filtering physical task management commands (PTskMgmt) for the physical LUN 718. Command filter 712 directs commands to either physical LUN 718 or virtual LUN 720. In various conditions, such as conflicting commands from multiple LUNs, the command filter 712 filters the commands and sends virtual commands (VCmd) to the virtual LUN 720, and virtual task management commands (VTskMgmt) to the virtual LUN 720. The command filter 712 passes through external drive information (ExtDrvInfo) from the protocol interface 710 to the LUN monitor 714.

The command filter 712 uses information from the LUNs and from the device state cache 722 to filter the commands and directives. A Bound signal from the device state cache 722 contains state information deduced from contents of the device state cache 722. If physical LUN 718 is bound, command filter 712 passes commands from the bound initiator to the physical LUN 718 and rejects or redirects commands from other initators.

The LUN monitor 714 receives filtered physical commands PCmd and physical task management commands PTskMgmt from the command filter 712 and issues the commands to the physical LUN 718 and captures physical status PStatus and some physical data PDataIn from physical LUN 718. LUN monitor 714 passes physical status PStatus back to protocol interface 710 and to device state cache 722 to maintain integrity of device state cache 722. LUN monitor 714 intercepts sense, log data from the commands PCmd and PTskMgmt, passing a filter active (FilterActive) signal to the data filter 716 to activate and deactivate the filter. LUN monitor 714 management of data filter 716 maintains accuracy of device state cache 722. LUN monitor 714 and data filter 716 extract state information from the physical LUN 718 data (PDataIn) and pass the state information in a sense data (SensData) to device state cache 722. LUN monitor 714 extracts state information from physical LUN 718 status (PStatus) and passes the state information as physical device state (PState) to device state cache 722. LUN monitor 714 also generates sense, log commands to refresh device state cache 722 when appropriate with device specific command sequences resolved using stored command sequences (CmdSeq) from the device profile cache 724.

The data filter 716 receives physical data PDataIn from the physical LUN 718 and, under control of FilterActive from LUN monitor 714 filters the PDataIn and passes the filtered data as physical data out from the initiator (PDataOut) to the protocol interface 710.

Physical LUN 718 is a physical storage drive, typically a tape drive but can be other types of drives such as disk drives, compact disk read-only-memory (CD ROM) drives and the like. Under direction of physical commands PCmd and physical task management directives PTskMgmt from the LUN monitor 714, the physical LUN 718 transfers data to and from an initiator. Physical data in to the initiator, PDataIn, is data accessed from physical LUN 718. Physical data out from the initiator, PDataOut, is data written to the physical LUN 718. Physical data PDataIn sent to an initiator can be filtered in the data path filter 716 to extract state information indicative of whether the physical LUN 718 is bound to an initiator. Physical device status information from the physical LUN 718 is accessed by the LUN monitor 714 and passed through the protocol interface 710 to an initiator.

Virtual LUN 720 is a virtual storage device that emulates various aspects of the physical LUN 718. In various embodiments, different aspects of a physical drive may be emulated. For example, in some embodiments, the virtual LUN 720 can emulate task management and/or other control aspects of operation. In other embodiments, virtual LUN 720 can include sufficient storage capacity to emulate data path aspects of operation. Under direction of virtual commands VCmd and virtual task management commands VTskMgmt from the command filter 712, virtual LUN 720 transfers information to and from an initiator. Physical data out PDataOut from an initiator can be written to the virtual LUN 720. Virtual data in VDataIn to an initiator is data that can be read from the virtual LUN 720. Device specific response sequences RspSeq are resolved by the device profile cache 724. Virtual status, VStatus, the status from the virtual LUN 720 passes to the protocol interface 710 for resolution and to an initiator.

Status is returned to the initiator from either physical LUN 718 or virtual LUN 720 and is resolved by the protocol interface 710 from either virtual status, VStatus, or physical status, PStatus.

The device state cache 722 receives information including physical device state PState and state information SenseData from the physical LUNs 718 to determine whether the physical LUN 718 is bound in real time. The device state cache 722 supplies the result of the determination as a Bound signal to the command filter 712 that uses the information to direct commands and management directives to the physical LUN 718 and the virtual LUN 720.

The device profile cache 724 stores command sequences CmdSeq and response sequences RspSeq for emulating a device type. Command sequences CmdSeq pass to the LUN monitor 714. Response sequences RspSeq pass to the virtual LUN 720.

Virtualization can be enabled and disabled, for example via task management directives TskMgmt that operate on the command filter 712 and LUN monitor 714 to pass all commands to the physical LUN 718. The virtualization feature is manageable on the basis that the feature can be enabled or disabled, as desired, for various reasons such as diagnostic analysis and testing, and capability to separately license the feature. In various implementations, the virtualization feature facilitates manageability by confining activation and deactivation in time to a single discrete interaction rather than a sequence of interactions. The system can avoid unstable or incorrect states using various techniques, such as initializing upon feature activation and sending status for all active LUNs upon feature deactivation.

Manageability constraints are minimal for simple, discrete binding criteria in which binding is determined on a single command. For more complex binding criteria, such as detection of a particular command sequence, manageability becomes more complicated and a state sequence may be implemented to enable consistent operation when virtualization is enabled or disabled, and/or the bound state is controlled. A state sequence may be used to enable and/or disable the system without rebooting, facilitating diagnostic testing and selection of the virtualization feature. A state sequence may be used to control binding state of a physical LUN without rebooting to facilitate field servicing.

Some embodiments facilitate configuration changes to support specific storage drives, for example by enabling of changes to the device profile cache 724. Some systems may use a volatile memory for device profile cache storage.

In various embodiments, the system may facilitate manageability by supporting configuration changes either in-band along the data pathway, or out-of-band with communication connections outside the data pathway. In-band configuration changes are made via configuration commands, for example by READ BUFFER and WRITE BUFFER commands with a MODE field set to VENDOR UNIQUE. Out-of-band configuration changes can be made via telnet, http, serial interfaces, and the like.

The system can support diagnostic commands for determining a LUN's bound state and identifying the initiator bound to the LUN. Access to the LUN's bound state is useful to detect whether a LUN is fixed in a bound state, resulting in unavailability of the LUN.

In various systems, diagnostic commands can be supported in-band and/or out-of-band. In-band diagnostic commands can include READ BUFFER, WRITE BUFFER, SEND DIAGNOSTICS, RECEIVE DIAGNOSTIC RESULTS, and the like. Out-of-band diagnostic methods may include automated telnet access, ftp utilization, and/or access via a proprietary interface.

Figure 8:
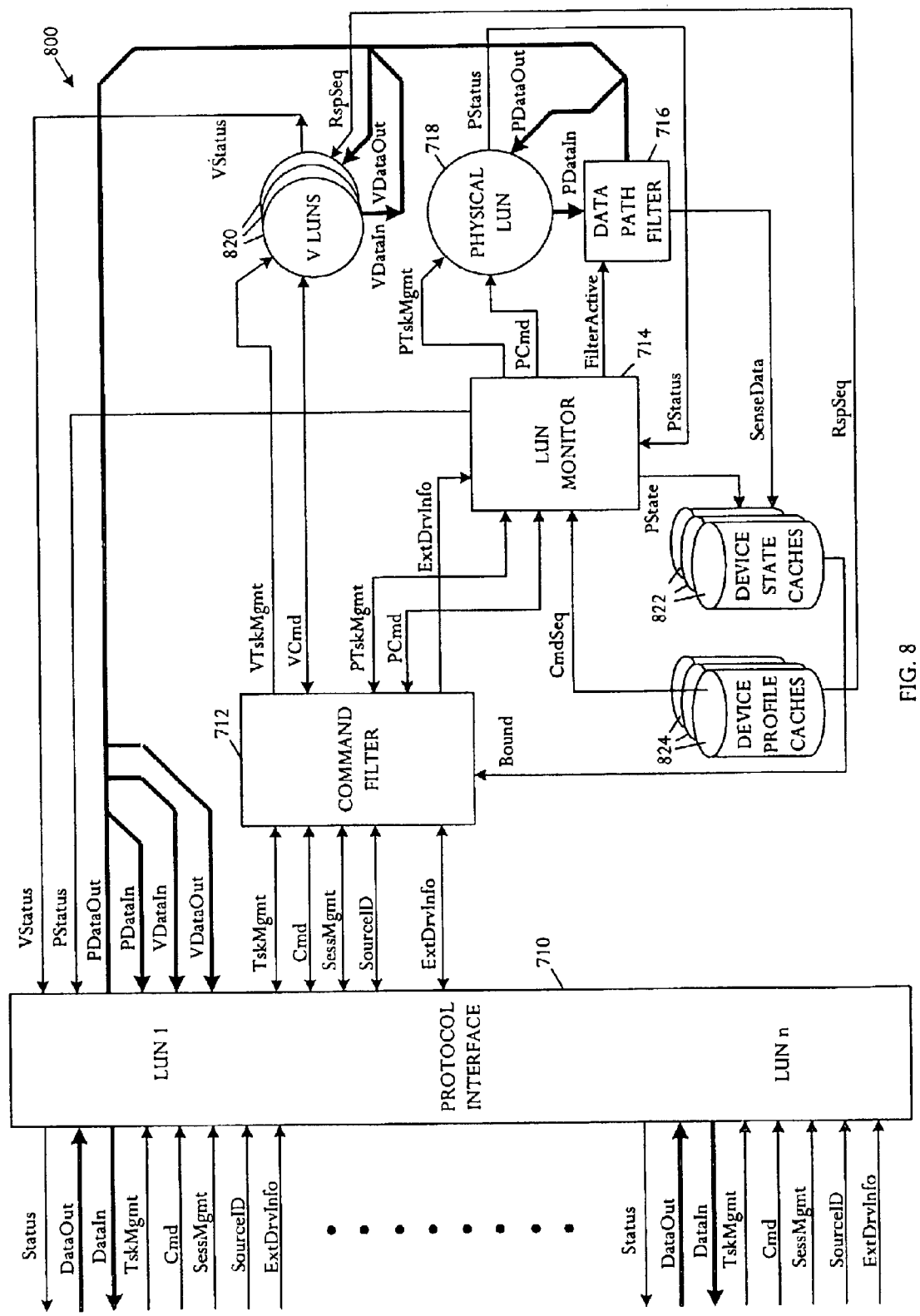
FIG. 8 is a schematic block diagram showing another embodiment of a storage system capable of improving availability, data integrity, and performance.

Referring to FIG. 8, a schematic block diagram shows another embodiment of a storage system 800. The illustrative storage system 800 can include additional devices and components in comparison to blocks in the system 700 shown in FIG. 7. In some embodiments, the storage system 800 can concurrently service additional initiators. In servicing more than two initiators, the storage system 800 can handle multiple configuration change requests and virtualize multiple copies of the physical LUN 718. Additional resources can be used to hold information for the multiple virtual LUNs 820 and backtrack the physical LUN state to service the requests for the multiple virtual LUNs 820 when the physical LUN 718 becomes available. In some examples, the storage system 800 can include additional device state caches 822. Some storage systems 800 can include a sufficient number of device state caches 822 to allocate one device state cache 822 for each initiator, enabling each initiator to have exclusive usage of the device state cache 822 and an unshared view of the storage device.

The additional resources of the storage system 800 enable acceptance of commands and management directives, and virtualization in busy conditions that the storage system 700 might reject commands. For example, if the physical LUN 718 is bound to a first initiator and a second initiator requests a configuration change, the storage system 800 can immediately respond as though a configuration change has occurred while waiting for the physical LUN 718 to become available.

The storage system 800 can add a virtual LUN 820 for each initiator to emulate the device's state. The storage system 800 can also add a capability to supply virtual data out VDataOut from an initiator to the virtual LUN 720, enabling data path spoofing or emulating. The storage system 800 can further add a static device profile cache 824 that contains an interface description of the virtual LUN 820 while retaining the device profile cache 724 to support communications with the physical LUN 718.

The virtual LUNs 820 can have a large memory or storage to simulate data access. In some embodiments, the virtual LUN can have a specified interface definition, for example a general definition that can emulate many different physical devices. With a generic LUN specification, manufacturers and suppliers of hosts, servers, initiators, operating systems and the like can comply with a common interface specification that is applicable to various different physical LUNs. Accordingly, the virtualization system handles any differences in physical LUN specifications and requirements. With the generalized interface, all commands can be routed through the virtual LUNs 820 to the physical LUN 718. Mapping commands can be used to map the virtual LUN definition to the physical LUN definition.

To support manageability for different drive types, including tape, disk, or tape/disk combinations, device support parameters can be supplemented by tuning parameters.

Referring to FIGS. 9A and 9B, command tables depict an example of behavior of a virtual tape LUN in response to primary commands and streaming commands. Primary commands comply with SCSI-3 Primary Commands (SPC-3) specification. Secondary commands comply with SCSI Controller Commands (SSC-2) specification. In the command tables, the term allowed refers to commands that are sent to the physical LUN. The term queued refers to commands that are queued in a router until a pending command is complete. Emulated refers to commands sent to the virtual LUN that return data and status via the device state cache, as expected. Conflict refers to commands sent to the virtual LUN that return a check condition status. Possible check conditions include reporting no media, or reporting a reservation conflict. The term n/a indicates the command occurs within a bound state and is inapplicable to columns indicating behavior in the unbound state.

Referring to FIGS. 10A and 10B, a table shows data in an embodiment of a template corresponding to a high-availability device application. Fields in the table or list contain meta-data such as accuracy or age, frequency or means of update, and update method. The table shows values that are set or updated in a template stored in the device state cache 722 in the first column. The second column shows commands that are issued during the acquisition method for updating the template. Typically the acquisition method can be stored in the device profile cache 724 and passed to the LUN monitor 714 to periodically update the template.

In some embodiments, for example the LUN virtualization system 700 shown in FIG. 7, commands that report drive state can be emulated. Commands that change drive state, change media position, read or write a media access memory, or read or write to the media can conflict. The virtual LUN supports commands that are supported by the physical LUN.

In some embodiments, for example the storage system 800 shown in FIG. 8, commands that report drive state and/or commands that change drive state can be emulated. Commands that change media position, read or write the media access memory, or read or write media may conflict or may be emulated, depending on the amount of virtualization implemented in the embodiment. The virtual LUN can support a different subset of commands than the physical device since the operating system and applications can be written specifically to support the virtual device. The physical device can be one or more disk devices, one or more tape devices, or a combination.

Although the illustrative example describes a particular storage device and system, the techniques may be used for various other systems. Generally, the techniques can be applied to any system in which multiple hosts, servers, or initiators can attempt to access the same device concurrently, wherein the device can address one request at a time.

What is claimed is:

1. An apparatus comprising:

a data path capable of coupling a physical device to a plurality of initiators;

an interface coupled to the data path and forming a command pathway between the plurality of initiators and the physical device; and a controller coupled to the data path and coupled to the interface, the controller comprising an executable process that creates a virtual device object that resolves conflicting concurrent attempts to access the physical device by a plurality of initiators, the virtual device object being capable of protecting state of the physical device during successive data transfer and media movement operations by emulating responses of the physical device and redirecting access to the physical device when the physical device becomes available.

2. The apparatus according to claim 1 wherein:

initiator requests are selectively directed to the physical device and the virtual device object dynamically based on state of the physical device.

3. The apparatus according to claim 1 wherein:

initiator requests are selectively directed to the physical device and the virtual device object based on requests from the plurality of initiators to the physical device and based on physical device status.

4. The apparatus according to claim 1 wherein:

initiator requests are selectively directed to the physical device and the virtual device object based on autonomous requests from the controller.

5. The apparatus according to claim 1 wherein:

the controller can concurrently create a plurality of virtual device objects.

6. The apparatus according to claim 1 wherein:

the virtual device object is configured in the image of the physical device.

7. The apparatus according to claim 1 wherein:

the virtual device object has access to a large storage to simulate data access.

8. The apparatus according to claim 1 wherein:

the virtual device object has a specified general interface definition that enables emulation of a plurality of different physical devices in response to a general set of access requests.

9. The apparatus according to claim 1 wherein:

the virtual device object emulates task management and aspects of control operation.

10. A system capable of managing access to a physical device from among a plurality of initiators, the system comprising:
- a virtual device capable of emulating at least one behavior of the physical device;
- a command filter capable of communicating with the plurality of initiators and selectively directing initiator requests to the physical device and the virtual device based on physical device state; and
- a monitor coupled to the command filter and the physical device and capable of determining state of the physical device and communicating a physical device state signal to the command filter.

11. The system according to claim 10 further comprising:
a process executable in the monitor that analyzes multiple conditions in a background process that extracts a device state parameter from the multiple conditions, the device state parameter for directing filtering of the command filter.

12. The system according to claim 10 further comprising:
an interface coupled to the command filter and coupled to a data path between the initiators, the physical device, and the virtual device, the interface capable of performing a virtual/physical mapping that enables virtualization of the physical device.

13. A system capable of managing traffic on a data path between a physical device and a plurality of initiators, the system comprising:
- a virtual device capable of emulating at least one behavior of the physical device;
- a command filter capable of alternatively directing commands to the virtual device and the physical device based on a physical device state parameter; and
- a monitor coupled to the data path and capable of analyzing multiple conditions in a background process that extracts a physical device state parameter from the multiple conditions, the physical device state parameter for directing filtering of the command filter.

14. The system according to claim 13 further comprising:
a data filter coupled to the monitor and coupled to a data path between the initiators and the physical device, the data filter being capable of accessing data to monitor control information.

15. The system according to claim 13 further comprising:
an interface coupled to the command filter and coupled to a data path between the initiators, the physical device, and the virtual device, the interface capable of performing a virtual/physical mapping that enables virtualization of the physical device.

16. A method of managing access of a plurality of initiators to a physical device comprising:
- monitoring requests from the plurality of initiators to the physical device and status of the physical device;
- determining whether the physical device is bound to one of the plurality of initiators;
- creating a virtual device that emulates at least one action of the physical device; and
- directing a request from an unbound initiator to the virtual device if the physical device is bound.

17. The method according to claim 16 further comprising:
detecting that the physical device is busy with a first initiator.

18. The method according to claim 17 further comprising:
sending a request from a second initiator to the virtual device if the physical device is busy with the first initiator or the device state is bound.

19. The method according to claim 16 further comprising:
- if the physical device is not busy and the device state is not bound;
- ending the command to the physical drive.

20. The method according to claim 16 further comprising:
determining a bound state comprising at least one of detecting media movement to the physical device, intercepting commands to the physical device, intercepting commands to a robotic that transports media to the physical device, detecting a LOAD UNLOAD command to the physical device, detecting a sequence of TEST UNIT READY commands to the physical device, detecting a REWIND command to the physical device, and detecting a specific, unique and repeatable sequence of commands to the physical device.

21. An apparatus for managing access of a plurality of initiators to a physical device comprising:
- means for monitoring requests from the plurality of initiators to the physical device and status of the physical device;
- means for determining whether the physical device is bound to one of the plurality of initiators;
- means for creating a virtual device that emulates at least one action of the physical device; and
- means for directing a request from an unbound initiator to the virtual device if the physical device is bound.

22. An apparatus comprising:
- a data path capable of coupling a physical device to a plurality of initiators;
- an interface coupled to the data path and forming a command pathway between the plurality of initiators and the physical device; and
- a controller coupled to the data path and coupled to the interface, the controller comprising an executable process that detects when a data storage device is executing a sequence of data transfer commands in response to an action of a first initiator and intercepts actions from other initiators while the sequence is active, resolving contention selectively according to opening condition by denying actions or creating a virtual device object that emulates responses of the physical device.

23. The apparatus according to claim 22 wherein the controller comprises an executable process that detects when a data storage device is executing a sequence of media movement commands in response to an action of the first initiator and intercepts actions from other initiators while the sequence is active.

24. The apparatus according to claim 22 wherein the controller comprises an executable process that detects when a data storage device is executing a sequence of data transfer and media movement commands in response to an action of the first initiator and intercepts actions from other initiators while the sequence is active.

* * * * *